Patented Feb. 3, 1942

2,272,036

UNITED STATES PATENT OFFICE 2,272,036

GOLF BALL COVER STOCK

John B. Dickson, Northampton, and Raphael A. Stafford, Chicopee, Mass., assignors to A. G. Spalding & Bros. Inc., New York, N. Y., a corporation of Delaware No Drawing. Application February 11, 1939, Serial No. 255,870

11 Claims. (Cl. 273—62)

This invention relates to golf balls and, particularly, to the cover stock therefor.

The golf balls to which the invention pertains are conventional to the extent that the balls are constituted of a resilient interior or central portion containing some rubber or the like and a cover therefor, the cover being in the condition of having been molded and pressed upon and amalgamated with the said interior portion.

Ordinarily the cover stock is composed largely of a pigmented balata composition containing some rubber.

It is an object of the invention to provide a golf ball or cover stock therefor that is of relatively low cost and of desirable toughness, resilience, resistance to cutting, and click when struck with a golf club. Another object is to provide a ball of very satisfactory putting characteristics. ther objects and advantages of the invention will appear from the detailed description that follows.

Briefly stated, the invention comprises a golf ball cover stock including a hard base material of good click characteristics and a toughening agent adapted to produce with the base material a cover stock retaining the feature of satisfactory click but being also so tough as to be resistant to cutting and cracking. The invention includes also a product containing critical proportions of the toughening agent, so as to produce the desired properties without imparting rubberiness or other undesirable quality. In the preferred embodiment of the invention, the toughening composition contains a resilient ingredient.

As the base material there is used a derivative of rubber that is adapted to be blended with, that is, is miscible with rubber or the like on rubber mixing rolls operated in accordance with usual practice and is hard and so resilient as to give satisfactory rebound when formed and pressed into ball form and then dropped at room temperatures upon a steel plate.

The material referred to and commercially known as "Thermoprene" possesses these general properties and is, therefore, satisfactory as the base material. Thermoprene is a product of the general type of that produced by the reaction of rubber with an agent selected from the group consisting of sulfuric acid, sulfonic acids, and sulfonyl chlorides and made as described in U. S. Patent 1,605,180, issued to Fisher on November 2, 1926; the procedure of the patent which is followed is that which gives a hard product. Thermoprene is described by Dawson and Schidrowitz in A. C. S. Monograph No. 74, Chemistry & Technology of Rubber, Reinhold, 1937, at pages 656–663.

Other materials derived chemically from rubber that may be used as the base material for the improved cover stock are the hard or stiff, rubber-miscible products made according to one of the following United States patents: 2,046,986; 2,115,053; 2,115,054; and 2,115,055, all issued to Herbert A. Winkelmann. These products of Winkelmann contain rubber hydrohalides, the hydrochloride being suitable for the present purposes, particularly when modified or stabilized as described in the said patents in connection with the making of the hard or stiff material. The rubber hydrohalides selected are resilient. Commercially they are known as "Marbon."

Thermoprene and Marbon are hard, resilient, chemical derivatives of rubber. They may be used as the base material either alone or blended with each other, and the invention will be illustrated by detailed description in connection with the use of these rubber derivatives.

The toughening agent used is one that may be blended with the base material on rubber mixing rolls and that so reduces the hardness of the selected base material as to give a mixture that, in final hardened condition, adheres properly to the interior of the golf ball, but is not subject to cracking when struck a hard blow with a golf club, and at the same time has the proper click. Rubber or polymerized chloroprene (referred to herein as neoprene) may be used as the toughening material. For this purpose, there may also be used a mixture of rubber and glue sometimes known as Collite or a material that may be referred to as Vistanex, Vistanex being the somewhat rubberlike (plastic) product of the polymerization of unsaturated aliphatic hydrocarbon gases produced in cracking or other step of petroleum refining, said gases containing essentially isobutylene and/or isoamylene, the product being generally designated by chemists as polyisobutylene. For some purposes there may be used as the toughening agent polymerized butadiene commonly known as Buna rubber or Perbunan, or an olefin polysulfide composition known as Thiokol. In any case, the grade of toughening agent selected from the above classes of materials is one of rubbery consistency or nature and of Shore hardness at 70° F. not appreciably above 50. The agent should consist essentially of such material, that is, should be free from any substantial proportion of admixed resilient ingredient of greater hardness than 50.

For best results in making covers for distance golf balls, the toughening agent should be resilient. Thus, it may consist essentially of rubber, neoprene, or like resilient material of desirably low Shore hardness, either singly, mixed together, or mixed with Vistanex or a protein such as glue.

With the plastic materials described there are incorporated various admixtures.

When neoprene is used, for instance, there may be admixed a polymerization or vulcanization accelerator. Thus, there may be incorporated a substantial proportion of zinc oxide, say, about 5 to 10 parts by weight of the oxide to 100 parts of neoprene. Also, there may be used pigmentary material, to establish the desired color of the cover stock and/or to adjust the density of the stock to that desired.

When rubber is used, there may be employed in the composition a vulcanizing agent and accelerator. Usual fillers for rubber compounds may also be used, as for example, zinc oxide.

Equivalent materials that are well known in the art of compounding may be substituted for these various admixtures.

The various materials selected are mixed in suitable manner, as, for instance, on conventional rubber mixing rolls. If desired, the base material may be prewarmed, to about the boiling point of water, and transferred to the rolls in advance of the other materials to be compounded. Also, the rolls may be kept somewhat warmer than usual for milling rubber. When the base material has been made thoroughly plastic, the toughening agent or agents are added and thoroughly incorporated.

When the various plastic materials desired in the finished cover stock have been mixed together, or at other suitable time, any admixtures to be made, as, for example, pigment, zinc oxide, vulcanizing agent and accelerator are incorporated and thoroughly dispersed.

The stock so made is then sheeted to a thickness slightly greater than that desired in the cover of the golf ball and is shaped into hollow shells or hemispheres. Two of these are then applied, from opposite directions, over the previously provided resiliently compressible ball interior of usual kind. The composite is then pressed firmly in heated molds, to amalgamate the shells with each other at their edges and also with the interior of the ball.

In the operations described, the temperature, pressure, and time of pressing, as well as the machines on which the various operations are performed, are those that are usual in this industry. For instance, the covers may be molded, before application over the ball interiors, at a temperature of about 230° F. maintained for 7 minutes.

The proportions of base material and toughening agent may be varied. Very hard and brittle base materials require a relatively large toughening effect, and the effectiveness of the toughening agent in a given proportion varies more or less with its degree of plasticity at atmospheric temperatures.

The following formulas are those of typical compositions, it being understood that conventional compounding materials may also be present. All proportions here and elsewhere in the specification and claims are expressed as parts by weight.

*Formula 1.*—Base material of the kind described 100 parts and toughening agent 50 to 170 parts.

*Formula 2.*—Base material 100 parts and toughening agent 50 to 170 parts, the toughening agent including at least 30 parts of a resilient ingredient such as rubber and/or neoprene.

*Formula 3.*—Thermoprene or Marbon 100 parts, Vistanex 15 to 100 parts, and rubber or neoprene 15 to 100 parts, the combined proportion of materials other than Thermoprene or Marbon being 50 to 170 parts.

*Formula 4.*—Thermoprene or Marbon 100 parts and 50 to 200 parts of a toughening agent therefor, the said agent consisting essentially of rubber and/or neoprene.

*Formula 5.*—Base material 100 parts, Vistanex 15 to 70 parts, and rubber and/or neoprene, as resilient ingredient of the toughening composition, 30 to 120 parts.

*Formula 6.*—Base material 100 parts, a rubber-containing toughening agent 30 to 120 parts, and glue intimately mixed with the other ingredients, suitably in about the same proportion as the rubber.

Balls made with the cover stock described are resistant to cutting, as shown by a guillotine test, and also to cracking of the cover and separation of it from the inner part of the ball. When dropped on a hard flat object or when struck properly with a golf club, they give a sharp, desirable click. In spite of the sharpness of the click, the improved balls are less lively in putting and the distance in putting is less sensitive to variations in stroking than are balls with conventional cover stock. Furthermore, the cover stock in uncured condition is tougher and shows greater resistance to cutting than conventional uncured balata cover stock.

The details given are for the purpose of illustration, not restriction, and variations within the spirit of the invention are intended to be included within the scope of the appended claims.

We claim:

1. A golf ball cover consisting of an intimate mixture of pigments, substantially 100 parts of a hard thermoprene formed by reacting rubber with a sulfur-containing acid, and from 50 to 170 parts of a rubbery material chosen from the class consisting of rubber, a composition formed by blending polyisobutylene and rubber, and a composition formed by blending glue and rubber, the ball cover being of good click characteristics, resistant to cutting, resistant to cracking during normal use, and of good putting characteristics.

2. A golf ball cover stock consisting essentially of an intimate mixture of thermoprene and a resilient toughening agent therefor consisting essentially of a material of shore hardness not above 50, at 70° F.

3. A golf ball cover of the kind defined in claim 1, the rubbery material being rubber.

4. A golf ball cover of the kind defined in claim 1, the rubbery material being rubber, there being substantially 110 parts of rubber to 100 parts of Thermoprene.

5. A golf ball cover of the kind defined in claim 1, the rubbery material being a composition formed by blending glue and rubber, there being from 30 to 120 parts of rubber and from 30 to 120 parts of glue.

6. A golf ball cover of the kind defined in claim 1, the rubbery material being a composition formed by blending substantially equal amounts of glue and rubber.

7. A golf ball cover of the kind defined in claim 1, the rubbery material being a composition formed by blending glue and rubber, there being substantially 55 parts of glue and substantially 55 parts of rubber.

8. A golf ball cover of the kind defined in claim 1, the rubbery material being a composition formed by blending polyisobutylene and rubber.

9. A golf ball cover of the kind defined in claim 1, the rubbery material being a composition formed by blending polyisobutylene and rubber, there being from 15 to 100 parts of rubber and from 15 to 100 parts of polyisobutylene.

10. A golf ball cover of the kind defined in claim 1, the rubbery material being a composition formed by blending polyisobutylene and rubber, there being substantially 55 parts of rubber and substantially 55 parts of polyisobutylene.

11. A composition golf ball cover made up of an intimate mixture of pigments, substantially 100 parts of a hard Thermoprene formed by reacting rubber with a sulfur-containing acid, and from 50 to 170 parts of a rubbery material chosen from the class consisting of rubber, a composition formed by blending polyisobutylene and rubber, and a composition formed by blending glue and rubber, the ball cover being of good click characteristics, resistant to cutting, resistant to cracking during normal use, and of good putting characteristics.

JOHN B. DICKSON.
RAPHAEL A. STAFFORD.